Aug. 30, 1966     A. TALALAY     3,268,926

SEAT CUSHION

Filed Dec. 9, 1964

INVENTOR.
ANSELM TALALAY
BY James P. Lindsay
ATTY.

United States Patent Office 3,268,926
Patented August 30, 1966

3,268,926
SEAT CUSHION
Anselm Talalay, New Haven, Conn., assignor to The B. F. Goodrich Company, New York, N.Y., a corporation of New York
Filed Dec. 9, 1964, Ser. No. 417,110
5 Claims. (Cl. 9—12)

This invention relates to cushioning and pertains more particularly to a buoyant seat cushion that not only is quite comfortable when sat upon but also has sufficient buoyancy to serve as flotation equipment for supporting a person in the water.

Because the level of sound developed by jet aircraft flying at low altitudes over inhabited areas is objectionable, it is customary, whenever possible, for aircraft during the initial climb after take-off or during an approach for landing to fly over a body of water that may be adjacent the airport in order to minimize the disturbance to the community surrounding the airport. Aside from the above consideration, a safety advantage is realized when an aircraft takes off over a body of water or makes an approach for landing over a body of water in that, if the aircraft malfunctions and an emergency landing becomes necessary, the chances of survival usually are greater for the passengers and crew if the emergency landing is made into water rather than onto land which may be uneven and occupied with obstructions. However, when an aircraft takes off over water or approaches a landing strip over water and it becomes necessary to make an emergency landing into the water, there is danger that those passengers and members of the crew who survive the emergency landing will drown unless some means is provided for maintaining them afloat in the water until rescuers reach them. Aircraft intended to fly overseas normally are provided with inflatable life rafts and inflatable life jackets that may be used by survivors of an emergency landing in the water but, because of space and weight considerations, aircraft intended for travel primarily over land are not so equipped. In order to provide an extra degree of safety for passengers and crew of aircraft which are not equipped with inflatable life rafts and inflatable life jackets but which on occasion will fly over bodies of water, some flotation equipment to which survivors of an emergency landing of the aircraft into water can cling until rescued should be provided in the aircraft.

A somewhat similar situation existed with respect to small pleasure boats which have become quite popular for recreation purposes. In an endeavor to provide additional safety for passengers in their boats, boat manufacturers have equipped their boats with seat clushions which not only are intended to provide cushioning for sitting upon but also are intended to serve as emergency flotation equipment capable of supporting persons in the water until rescued (the cushions being provided with a degree of buoyancy). Various seat cushion constructions that exhibit at least some degree of buoyancy have been proposed for use in small boats. One proposed cushion construction merely consists of an inflatable envelope which when inflated assumes the desired cushion contour. An inflated cushion, however, is subject to the disadvantage of being susceptible to puncture which would render the envelope useless either as a cushion or as flotation equipment. Another cushion construction which has been suggested is a cushion comprised of cork filler encased in a fabric or plastic envelope. Such cork filled cushions are not entirely satisfactory because they are not comfortable to sit upon and because the cork may become waterlogged and lose its buoyancy after being exposed periodically to water over a prolonged period of time unless the cushion covering is watertight. Recently, the use of flexible resilient closed-cell cellular materials, such as closed-cell vinyl chloride polymer foam, as boat cushioning has found enthusiastic acceptance. Flexible resilient closed-cell cellular cushioning materials are composed of a myriad of minute gas filled cells, each of which may be likened to a small inflated balloon, that render the material inherently buoyant. Since each closed cell is independent of the other closed cells in such materials, the rupture by puncturing or otherwise of a few of the thousands of closed cells in the cushion made of the closed-cell cellular material does not objectionably reduce the degree of buoyancy of the cushion. However, cushions made of such closed-cell cellular materials normally do not provide the degree of comfort desired since such materials inherently are rather firm and unyielding when sat upon.

It will be appreciated that for a seat cushion which is intended to be sat upon for perhaps several hours and which may be called upon to maintain someone afloat in water for a considerable period of time to be completely satisfactory it must provide comfortable support when sat upon and must be sufficiently buoyant even after being in the water for several hours to maintain a man of at least average size afloat. Previously, it usually has been necessary to compromise somewhat in one or the other of these requirements to provide a cushion which is at all acceptable.

The present invention combines the comfort of opencell cushioning and the buoyancy of closed-cell cellular flotation material (that is, a material that has a specific gravity less than that of water) in an arrangement which allows the advantages of both materials to be used to their fullest, and provides a seat cushion that is ideally suited for use in aircraft and on boats. In accordance with the present invention, open-cell flexible resilient cushioning is utilized in the portion of the cushion which underlies and actually supports a person who is sitting upon the cushion while closed-cell cellular material is employed along the side marginal zones of the cushion and, if desired, along the back marginal zone of the cushion to provide buoyancy to the cushion. As will be explained in greater detail hereinafter, because of the way a cushion is depressed when sat upon, the side marginal zones and back marginal zone of the cushion are not normally required to support the weight of someone sitting upon the cushion in the same manner as the front marginal zone of the cushion which must support the thighs of the person sitting upon the cushion and as the central portion of the cushion which must support the main weight of the trunk of a person sitting upon the cushion. The provision of buoyant material along the side marginal zones of the cushion and, if desired, along the back marginal zone of the cushion imparts sufficient buoyancy to the cushion so that the cushion will support a person lying upon the cushion in the water for several hours but yet is quite comfortable when sat upon.

The invention will be more fully understood by referring to the following description of two embodiments of the invention and by referring to the drawing in which.

Figure 1:
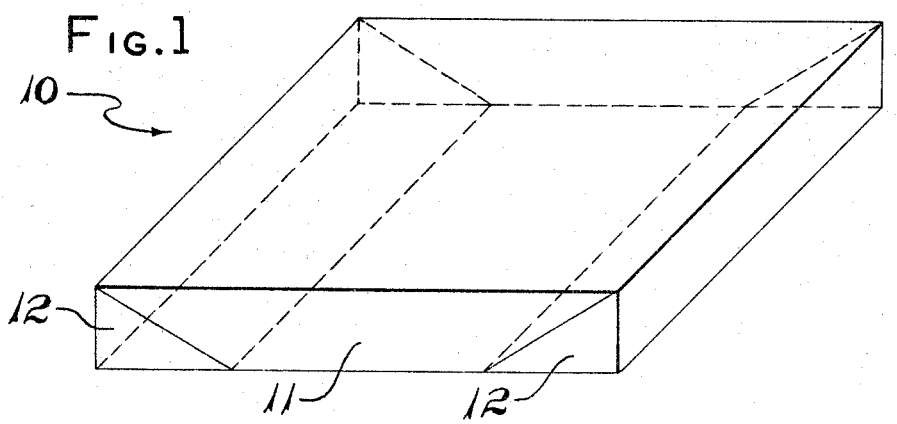
FIG. 1 is an oblique view of a seat cushion embodying this invention.

Referring to FIG. 1, the cushion 10 comprises a flexible resilient body portion 11 which underlies and supports the trunk and thighs of a person sitting upon the cushion and longitudinally disposed flotation elements 12, 12 of closed-cell cellular flotation material extending along the side marginal zones of the cushion 10 for imparting sufficient buoyancy to the cushion so that the cushion is enabled to support the weight of at least an average sized man lying on top of the cushion in the water.

The body portion 11 of the cushion 10 may be formed of any flexible resilient open-cell cellular material, such as open-cell polyurethane foam, open-cell vinyl chloride polymer foam or open-cell latex foam rubber, that provides a comfortable base for supporting a person sitting upon the cushion. Flexible resilient open-cell polyurethane foams and latex foam rubber customarily are used in the manufacture of furniture cushions because cushions made of these materials are extremely comfortable when sat upon and, therefore, are preferred for use in the body portion 11 of cushion 10. If desired, the body body portion 11 may be formed of horizontally disposed layers of flexible resilient open-cell material which layers may be of a different material and/or firmness. Thus, the body portion 11 might be formed of a very soft latex foam rubber top layer disposed over a bottom layer of firmer polyurethane foam. The density of the cellular material selected for making the body portion 11 of the cushion 10 will vary depending upon the particular cellular material employed, the thickness of the cushion and the softness desired. Generally, cushion structures are approximately 4 inches thick, and for latex foam rubber cushions of such thickness a latex foam rubber having a density of from about 3.5 to 4.5 pounds per cubic foot customarily is used.

The longitudinally disposed flotation elements 12, 12 provide the cushion with buoyancy and may be formed of any closed-cell cellular material which is sufficiently buoyant to impart the desired buoyancy to the cushion structure. Desirably the material selected for use in elements 12, 12 is flexible and resilient so that the flotation elements 12, 12 of the cushion will not be unduly unyielding. Closed-cell polyurethane foams and closed-cell vinyl chloride polymer foams, for example, may be used. A closed-cell cellular material made by the process set forth in U.S. Patent No. 2,737,503 is particularly suitable for use in the flotation elements 12, 12.

Figure 4:
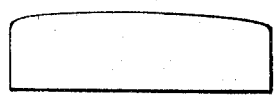
FIG. 4 is a schematic view in front elevaiton of a foam rubber cushion.
Figure 5:
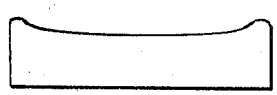
FIG. 5 is a schematic view in front elevation of the foam rubber cushion shown in FIG. 4 when under about 25% deflection.
Figure 6:
FIG. 6 is a schematic view in front elevation of the foam rubber cushion shown in FIG. 4 when under about 65% deflection.

While the flotation elements 12, 12 are shown to be wedge-shaped sections, it will be understood that the particular cross-sectional shaped of elements 12, 12 may be varied from the wedge-shaped configuration of the illustration. The reason why a wedge-shaped flotation element would be preferred is understandable when one perceives of the manner in which a cushion normally is depressed when sat upon. FIG. 4 of the drawing illustrates schematically a cushion with a slight crown (i.e. a cushion with a slightly rounded top face). When the cushion is sat upon and compressed by a person to a 25% deflection, the central portion of the cushion which supports the trunk of the body and the front marginal zone of the cushion which supports the thighs of the person sitting on the cushion are compressed while the marginal zones along the side of the cushion and the marginal zone along the rear of the cushion are not particularly load supporting and remain essentially uncompressed, as is illustrated schematically in FIG. 5. When a person of even heavier weight sits upon the cushion compressing the cushion to 65% deflection (the maximum deflection normally encountered) the same condition persists, as is illustrated schematically in FIG. 6. It will be appreciated that along the two marginal side zones of the cushion and along the rear marginal zone of the cushion there exist generally wedge-shaped portions which may be considered to have a right-angle triangular cross-sectional configuration with the right angle positioned along the bottom edge of the cushion which wedge-shaped portions do not contribute materially to the load-bearing characteristics or comfort of the cushion.

The use of generally wedge-shaped flotation segments 12, 12 having essentially a right-angle triangular cross-section disposed with the right-angle extending along the bottom edge of the cushion 10 allows for the provision of substantially the maximum amount of flotation material in the cushion without interfering objectionably with the comfort of the cushion. It will be appreciated, however, that the flotation elements 12, 12 may have different configurations without departing from the spirit of this invention. For example, instead of wedge-shaped segments, the flotation elements might be cylindrical in shape or rectangular in shape, etc.

Figure 2:
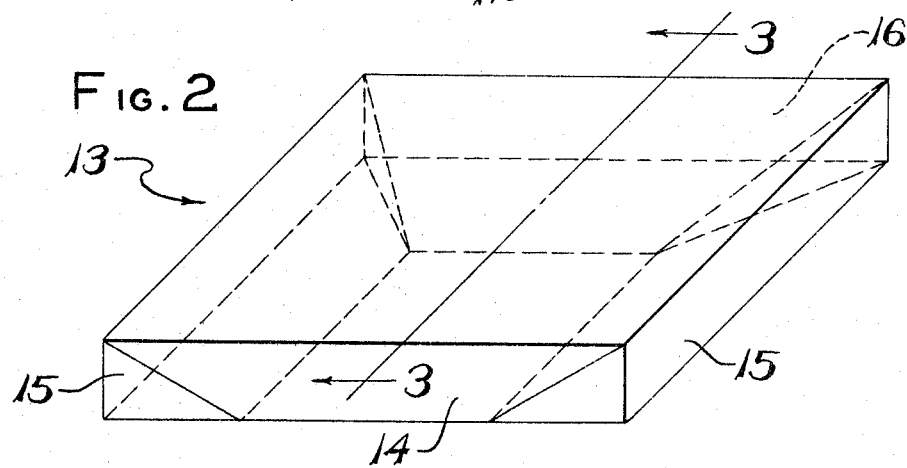
FIG. 2 is an oblique view of a seat cushion showing a second embodiment of this invention.
Figure 3:
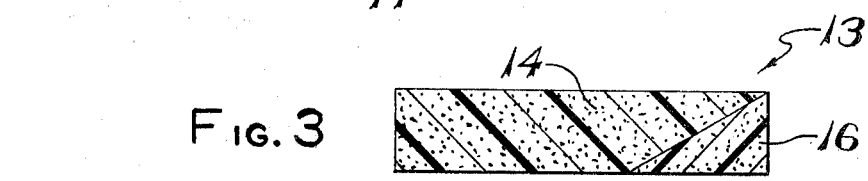
FIG. 3 is a section on the line 3—3 of FIG. 2.

A second embodiment of the invention is shown in FIG. 2. The seat cushion 13 of this embodiment of the invention is similar to seat cushion 10 in that cushion 13 is comprised of a flexible resilient body portion 14 (which is equivalent to body portion 11 of cushion 10) and longitudinally disposed flotation elements 15, 15 of closed-cell cellular material (which are equivalent to flotation elements 12, 12 of cushion 10) extending along the side marginal zones of cushion 13. In addition to flotation elements 15, 15, cushion 13 also is provided with a flotation element 16 that extends along the rear marginal zone of the cushion 13. The flotation elements 15, 15 disposed along the side marginal zones of cushion 13 and the flotation elements 16 extending along the rear marginal zone of cushion 13 are shown to be wedge-shaped segments having essentially a right-angle triangular cross-section with the right angle positioned along the bottom edge of cushion 13, although, as explained heretofore in connection with flotation elements 12, 12 of cushion 10, the wedge shaped segments merely illustrate the preferred shape of the flotation elements. Also, the configuration of flotation element 16 need not be the same as that of flotation elements 15, 15 (for example, flotation element 16 might be rectangular in shape while flotation elements 15, 15 might have the wedge-shaped configuration shown).

It generally is believed that a seat cushion for use in aircraft or on boats which is intended to serve not only as a seat cushion but also as auxiliary flotation equipment probably should be provided with at least 14 pounds buoyancy in order to adequately support in the water a person of normal size. A test cushion constructed as illustrated in FIG. 2 and having a body portion made of open-cell polyurethane foam and flotation elements made of closed-cell vinyl chloride polymer cellular material after an initial immersion in water for about 15 minutes to completely saturate the cushion with water exhibited a buoyancy exceeding 18 pounds. The buoyancy of the cushion remained constant throughout an eight hour test period. The test cushion measured 17 inches in width, 19 inches in depth and 4 inches in thickness and had wedge-shaped flotation elements with right-angle triangular cross-sectional shape, the sides of the triangle measuring 4 inches on a side.

In actual tests of cushions constructed in accordance with the present invention it was found that the flotation elements disposed along the side marginal zones of the cushion in endeavoring to remain on the surface of the water when a person is lying on the cushion in the water cause the cushion to curl about the body of the person and cradle the person in the cushion. As a result, the person lying on the cushion in the water is less likely to be swept off the cushion by a wave.

The flotation elements of the cushion may be adhered to the body portion of the cushion with adherive in order to form the unitary structure, as is customary in cushioning manufacture where two or more components of a cushion are to be combined. The cushion generally will be enclosed in or covered with a fabric or plastic cover in order to protect the cushion from abrasive wear and for decorative purposes. The cover, if it is not fabricated of a material which allows substantially free passage of air therethrough, may be provided with air vents to permit air to be expelled through the cover when the cushion is sat upon and to permit air to be drawn back through the cover and into the cushion when a person removes himself from the cushion.

If desired, the cushion may be provided with a crowned upper surface and a rounded front surface. Also, if buoyancy in addition to that provided by the flotation elements is needed, a layer of closed-cell cellular material disposed beneath the body portion of the cushion may be employed.

It will be appreciated that a cellular material need not have 100 percent interconnecting cells to be considered to be an open-cell cellular material but need have only a substantial perponderance of interconnecting cells. For example, a flexible resilient cellular material having about 75 percent of the cells interconnecting provides an acceptable cushioning material for the body portion of the cushion. The open-cell cellular material, in order to provide some additional degree of buoyancy to the cushion, might even have small particles of closed-cell cellular material dispersed therethrough as a filter material. Also, a cellular material need not have 100 percent closed cells to be considered to be a closed-cell cellular material but need have only a substantial preponderance (at least about 75 percent) of the cells that are closed cells.

I claim:

1. A seat cushion intended to serve as auxiliary flotation equipment for supporting a person in the water which comprises a body portion made of flexible resilient open-cell cellular foam material which underlies and supports the trunk and thighs of a person sitting upon the cushion in a normal manner and provides a resilient cushioning component for comfortable seating, and longitudinally disposed flotation elements positioned along the side marginal zones of the cushion, said flotation elements being made of a closed-cell cellular foam material having a specific gravity less than that of water and being combined with said body portion of the cushion to provide a unitary structure, the margins of the upper surface of said body portion being substantially coextensive with the upper marginal edges of said seat cushion and said body portion having a height substantially equal to the height of said flotation elements.

2. A seat cushion intended to serve as auxiliary flotation equipment for supporting a person in the water which comprises a body portion made of flexible resilient open-cell cellular foam material which underlies and supports the trunk and thighs of a person sitting upon the cushion in a normal manner and provides a resilient cushioning component for comfortable seating, and longitudinally disposed flotation elements positioned along the side marginal zones of the cushion, said flotation elements being made of a flexible resilient closed-cell cellular foam material having a specific gravity less than that of water and being combined with said body portion of the cushion to provide a unitary structure, the margins of the upper surface of said body portion being substantially coextensive with the upper marginal edges of said seat cushion and said body portion having a height substantially equal to the height of said flotation elements.

3. A seat cushion intended to serve as auxiliary flotation equipment for supporting a person in the water which comprises a body portion made of flexible resilient open-cell cellular foam material which underlies and supports the trunk and thighs of a person sitting upon the cushion in a normal manner and provides a resilient cushioning component for comfortable seating, longitudinally disposed flotation elements positioned along the side marginal zones of the cushion, and a flotation element positioned along the rear marginal zone of the cushion, said flotation elements being made of a flexible resilient closed-cell cellular foam material having a specific gravity less than that of water and being combined with said body portion of the cushion to provide a unitary structure, the margins of the upper surface of said body portion being substantially coextensive with the upper marginal edges of said seat cushion and said body portion having a height substantially equal to the height of said flotation elements.

4. A seat cushion intended to serve as auxiliary flotation equipment for supporting a person in the water which comprises a body portion made of flexible resilient open-cell cellular foam material which underlies and supports the trunk and thighs of a person sitting upon the cushion in a normal manner and provides a resilient cushioning component for comfortable seating, and longitudinally disposed flotation elements positioned along the side marginal zones of the cushion, said flotation elements being made of a flexible resilient closed-cell cellular foam material having a specific gravity less than that of water and having a right-angle triangular cross-sectional configuration, said flotation elements being positioned along the side marginal zones of the cushion with the right-angle of the right-angle triangular cross-section of each flotation element positioned along the bottom edge of the cushion, said flotation elements being combined with said body portion of the cushion to provide a unitary structure.

5. A seat cushion intended to serve as auxiliary flotation equipment for supporting a person in the water which comprises a body portion made of flexible resilient open-cell cellular foam material which underlies and supports the trunk and thighs of a person sitting upon the cushion in a normal manner and provides a resilient cushioning component for comfortable seating, and longitudinally disposed flotation elements positioned along the side marginal zones of the cushion, said flotation elements being made of flexible resilient closed-cell cellular foam material having a specific gravity less than that of water, and a flotation element positioned along the rear marginal zone of the cushion and being made of a flexible resilient closed cell cellular foam material having a specific gravity less than that of water, said flotation elements disposed along the side marginal zones of the cushion and said flotation element disposed along the rear marginal zone of the cushion having right-angle triangular cross-sectional configurations and being positioned along their respective marginal zone of the cushion with the right-angle of the right-angle triangular cross-section positioned along the bottom edge of the cushion, said flotation elements being combined with said body portion of the cushion to provide a unitary structure.

References Cited by the Examiner

UNITED STATES PATENTS

| | | | |
|---|---|---|---|
| 1,960,474 | 5/1934 | Browne | 9—311 |
| 2,350,679 | 6/1944 | Hann | 9—12 X |
| 2,804,123 | 8/1957 | Kling | 9—7 X |
| 3,111,606 | 11/1963 | Lo | 9—340 |

MILTON BUCHLER, *Primary Examiner.*

T. MAJOR, *Assistant Examiner.*